United States Patent [19]
Mani

[11] Patent Number: 5,972,191
[45] Date of Patent: Oct. 26, 1999

[54] ELECTRODIALYSIS APPARATUS

[75] Inventor: K. N. Mani, Basking Ridge, N.J.

[73] Assignee: Archer Daniels Midland Company, Decatur, Ill.

[21] Appl. No.: 08/784,050

[22] Filed: Jan. 17, 1997

[51] Int. Cl.$^6$ .................................................. B01D 61/44
[52] U.S. Cl. .......................................... 204/631; 204/635
[58] Field of Search ..................................... 204/635, 631

[56] References Cited

U.S. PATENT DOCUMENTS

| 3,878,086 | 4/1975 | Haswell et al. | 204/635 |
| 4,319,978 | 3/1982 | Millman | 204/635 |

FOREIGN PATENT DOCUMENTS

| 38-4337 | 4/1963 | Japan | 204/635 |

*Primary Examiner*—Arun S. Phasge
*Attorney, Agent, or Firm*—Laff, Whitesel & Saret, Ltd.; J. Warren Whitesel

[57] ABSTRACT

A gasket for an electrodialysis cell assembly has a series flow path comprising a plurality of flow path sections joined by restrictor sections. Each of the flow path sections has a relatively wide width. The restrictor has less than the wide width so that a fluid flowing in the series flow path must increase its velocity as it flows through the restrictor. The result is that the fluid exiting the restrictor cause turbulence and agitation in the flow path sections. Manifold holes are located at opposite ends of the series flow path. A rigid port is positioned between each of the manifold holes and the ends of the series flow path. The successive cells of the assembly are defined by a pair of bipolar membranes with cation and/or anion exchange membranes between them. One of the gaskets is located between each two of the membranes.

28 Claims, 15 Drawing Sheets

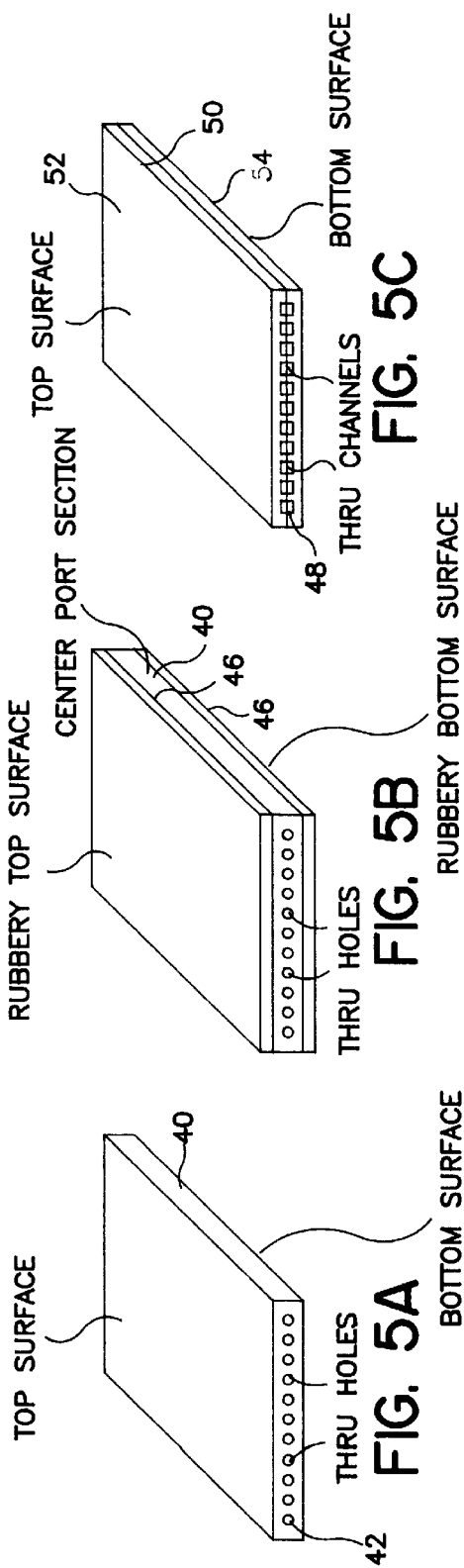
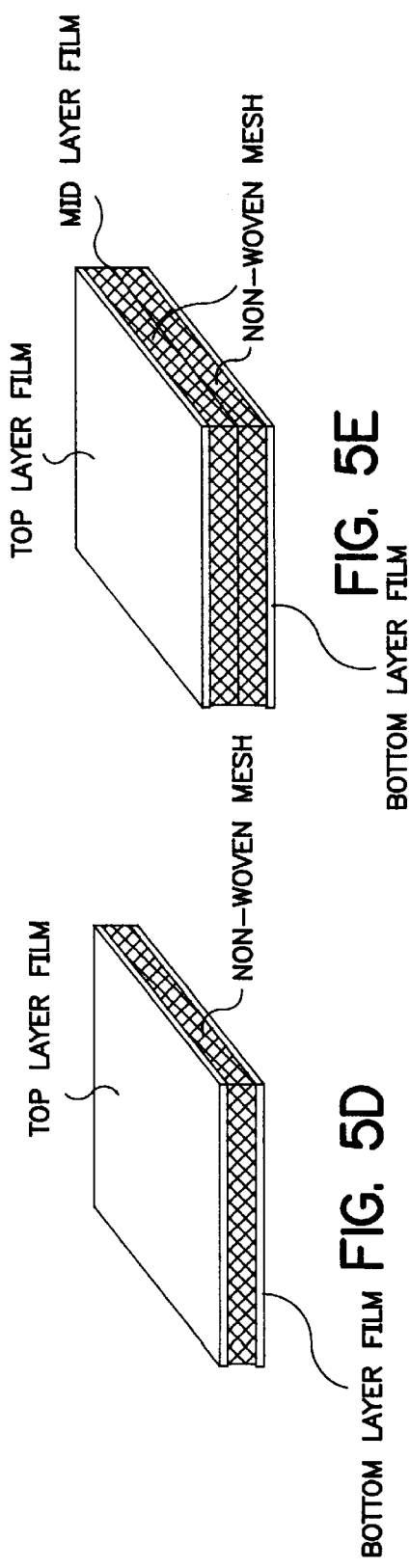

ELECTRODIALYSIS APPARATUS

This invention relates to electrodialysis apparatus and to gaskets used therein and more specifically, to electrodialysis apparatus that is essentially free of intercompartment and external leaks, that operates at significant current densities, at high levels of salt conversion/recovery, and at low pressure drops, while reducing both the recycle pumping needs and multiple stages.

BACKGROUND

This invention is suitable for use in electrodialysis ("ED") apparatus, with monopolar or bipolar ion-exchange membranes, especially suitable for producing concentrated acids, bases, and salts from dilute salt streams using a direct current driving force. Such apparatus uses ion-exchange membranes to separate, concentrate or transform ions that are usually present in aqueous solutions. The electrodialysis process is driven by a direct current force.

A number of publications and patents describe the membrane technology and the components used to construct the equipment used in the process. Of these publications, the ones judged most informative are:

U.S. Department of Energy Report on *"Membrane Separation Systems—A research needs Assessment"*; Chapter 8 on Electrodialysis, April 1990. DOE/ER/30133-HI

*"Handbook of Industrial Membrane Technology"* Ed. by M. C. Porter. Chapter 8, Noyes Publications, 1990

*"Electrodialysis Water Splitting Technology"* by K. N. Mani; J. Membrane Sci., (1991), 58, 117–138

U.S. Pat. No. 5,240,579; 4,871,431; 4,863,596; 4,786,393; 4,737,260; 4,707,240; 4,569,747; 4,319,978; 4,303,493; 4,226,688; 4,172,779; 4,067,794; 3,993,517; 3,985,636; 3,878,086; and 3,679,059

An electrodialysis stack contains an anode and a cathode electrode at its two ends in order to provide an electrical input. Assembled therebetween is a series of membranes and separators (gaskets) secured together in face to face contact, like in a plate and frame filter press. In order to ensure long term reliability of the unit, the electrode chambers may be isolated hydraulically from the main processing unit through a use of a set of membranes and separate fluid circuits.

In a commercial plant, the main processing unit comprises a large number of unit cells, such as 50–250, for example. Each of these unit cells, comprises ion-exchange membranes and solution compartments. Each solution compartment is contained within a gasket, which may be made of a plastic material, such as polyethylene and which may be about 0.5–5 mm thick. These gaskets separate the membranes and provide an adequate sealing at the edges and at other areas, as may be necessary. The gaskets also provide a support for the adjacent membranes and enable a fluid flow into and out of the solution compartment.

Each of the membranes contains manifold holes cut out in the gaskets and "ports" extending from the manifold holes to the solutions compartments in the gasket. The manifold holes and membranes of an electrodialysis stack are aligned to form passage ways which enables the individual process stream to be delivered into and out of the individual solution compartments via the ports.

The unit cells in an electrodialysis stack may be made in a variety of types and sizes. For example, beginning at the anode end for the cell, a first type of unit cell comprises a cation membrane, a dilution or feed compartment, an anion membrane and a concentrate or product compartment. These components form a unit that is used in the desalination of brine solutions and in the recovery and production of salts. Such a unit is called a "standard electrodialysis concentration or desalting cell".

A second type of unit cell comprises a bipolar membrane, a feed or salt/acid compartment, wherein, a feed, such as a sodium salt or an organic acid, is acidified by the $H^+$ ions generated by the bipolar membrane, a cation membrane that transports the sodium cation, and a base or product compartment where the sodium cation combines with the $OH^-$ ions generated by the bipolar membrane to form a sodium hydroxide (base). Such a unit cell is called a "two-compartment cation cell".

A third type of unit cell comprises a bipolar membrane, a product or acid compartment, an anion membrane and a feed or salt/base compartment. Such a unit is called a "two-compartment anion cell" and may be used to basify an ammonium salt solution in order to generate an acid product and an ammonia rich base solution.

Yet another type of unit cell comprises a feed or salt compartment, a cation membrane, a base compartment, a bipolar membrane, an acid compartment and an anion membrane. Such a unit is called a "three-compartment bipolar cell" and may be used to convert a salt, such as sodium chloride, into sodium hydroxide and hydrochloric acid.

Unit cells containing more than three membranes and three compartments are also known. Excluding electrode rinse loops, a two-compartment cell can handle two process streams while a three-compartment cell can handle three process streams and so on. When a direct current is passed through the central ("active") area of an electrodialysis stack, the ions contained in a solution migrate in the direction of the current. The cations cross the cation membrane and move toward the cathode or negative electrode, while the anions move across the anion membrane and toward the anode or positive electrode. If a bipolar membrane is deployed in the electrodialysis stack with the cation side facing the cathode, the direct current input accelerates the dissociation of water at the membrane's interface. As a result hydrogen ($H^+$) and hydroxyl ($OH^-$) ions are concentrated on the cathode and anode sides, respectively. Depending on the cell configuration and the process deployed, the end result is a concentration of a salt from a dilute stream or a depleted salt stream or is a conversion of a salt into its acid and base components.

While the performances of the specific ion-exchange membranes that are deployed and the adequate pretreatment of the feed stream, (e.g. pH adjustment, filtration etc.) are important to a successful operation of electrodialysis process, an equally important aspect is the flow and distribution of the fluids inside the gasket or separator.

Commercially the two major electrodialysis designs in common use are called "sheet flow" and "tortuous flow".

Examples of sheet flow separators are sold by Asahi Glass, Tokuyama Soda, and by Aqualytics, a division of Graver Water. The active area is usually 50–85% or more of the overall gasket area in order to maximize the membrane utilization. This active area is open to both fluid and electrical flow. The membrane itself is supported by a non-woven "mesh" material having approximately the same overall thickness as the gasket. The mesh also distributes the fluid in the active area. To further ensure a uniform fluid distribution across the length or width of the active area, a multiplicity of feed manifolds and ports are employed. In these conventional stacks, the pressure drop and membrane strength considerations dictate that the superficial linear velocity of the liquid be kept low, typically in the order of 5–10 cm/sec.

Experience indicates that the distribution of fluids over a large cross sectional area can, as in many commercial stacks employing the "sheet flow" design, be a problem when the process is operated at high electrical current densities (>50 mA/cm$^2$) or at lower stream conductivities (<20 mS/cm). Other problems occur with membrane swelling or wrinkling, particularly when there are even trace amounts of precipitable substances in the feed stream. Further, the conventional use of multiple manifolds and ports aligned in a stack of gaskets increases the intercompartment leakage.

Shunt and stray electrical current problems result in process inefficiencies which can cause an overheating or meltdowns of gaskets. This problem usually limits to about 100 the number of unit cells that can be safely deployed in series, without requiring some kind of electrical current interruption structure located between electrodes in a commercial stack operating with highly conductive solutions or at high current densities.

The overall flow rate requirements are high, due to the need to maintain the requisite linear velocity over large cross-sectional flow area. This need, in turn, requires the use of larger pumps and recirculation tanks. If mechanically weak (e.g. 20–45 psi burst strength), the prior art membranes are poorly supported in the large active area. They are easily damaged or broken over a long term operation due to the pressure variations in the feed streams.

Ionics Inc. uses electrodialysis stacks having a tortuous flow electrodialysis design employing gaskets having a long liquid flow path. Individually, the Ionics flow channels are quite narrow, (typically 1–1.5cm). They make several 180° turns between the entrance and exit ports. The Ionics ports themselves are simply slots formed in the gaskets. The membranes are mechanically stiff structures in order to prevent their collapse into and the resultant blockage of the ports.

To overcome polarization problems associated with the low conductivity feeds, a higher linear flow velocity is used, typically 30–50 cm/sec. There are high pressure drops in such stacks (as high as 3–6 bars vs.0.5–2 bar for the sheet flow stacks). Consequently, the conventional membranes for the tortuous flow stack s have been thick and mechanically sturdy. Typically, they have a high electrical resistance leading to high power consumption.

Tortuous flow stacks are suitable for desalination applications which operate at a low electrical current density (0.1–10 mA/cm$^2$). For chemical production applications, such as a conversion of sodium chloride to caustic soda and hydrochloric acid in a three compartment cell which operates at high current density (30–200 mA/ cm$^2$) ,the amount of heat generated and the resulting temperature increases are unacceptable when using tortuous flow stacks unless the active areas of the stack are small. This limit on the active area size, in turn, requires the use of a large number of stacks in a commercial plant, with an attendant high cost. The stacks are also prone to intercompartment leakage because the membranes swell and spall.

SUMMARY OF THE INVENTION

Therefore, in keeping with one aspect of this invention, an improved gasket overcomes these and other shortcomings of the prior designs. The inventive gasket has a negligible intercompartment leakage and, when compared with the sheet flow design, provides higher fluid velocities at comparable pressure drops, higher conversion and product recovery with an improved performance in the presence of small amounts of precipitable species.

The invention enables a use of higher performance, but mechanically weaker, ion-exchange membranes as compared to the state of the art tortuous flow membrane design.

The improved gasket design may be used in electrodialysis operations for the production and recovery of chemicals. The gasket design is particularly suitable for use in large size commercial stacks.

In keeping with another aspect of this invention, cells of a stack assembly are defined by bipolar membranes with cation and anion exchange membranes between them. A gasket for an electrodialysis cell assembly has an active area containing a series flow path comprising a plurality of flow path sections joined by restrictor sections. The active area is covered and supported by a mesh. Manifold holes are located at the ends of the series flow path. A rigid port is positioned between each of the manifold holes and the ends of the series flow path to provide fluid communication between the manifold and the series flow path in the gasket containing the port. In a stack of gaskets and membranes, each has manifold holes that align with corresponding holes in all of the other gaskets and membranes to form a passage way through the stack. The ports connect these passageways to the active areas in the particular gasket that contains the ports.

BRIEF DESCRIPTION OF THE DRAWINGS

Preferred embodiments of the invention are shown in the attached drawings, in which:

FIG. 2(*a*) shows a similar inventive gasket having ports coupled to center manifold holes for a three-compartment cell;

FIG. 2(*b*) is an exploded view which shows two gaskets of FIG. 2 and one gasket of FIG. 2(*a*) assembled to form a three compartment cell;

FIGS. 5(*a*)–5(*e*) are perspective views which show some of the inventive port designs that may be used in the inventive gasket to establish fluid communication between manifold holes and a series flow path;

BRIEF DESCRIPTION OF THE INVENTION

Figure 1:
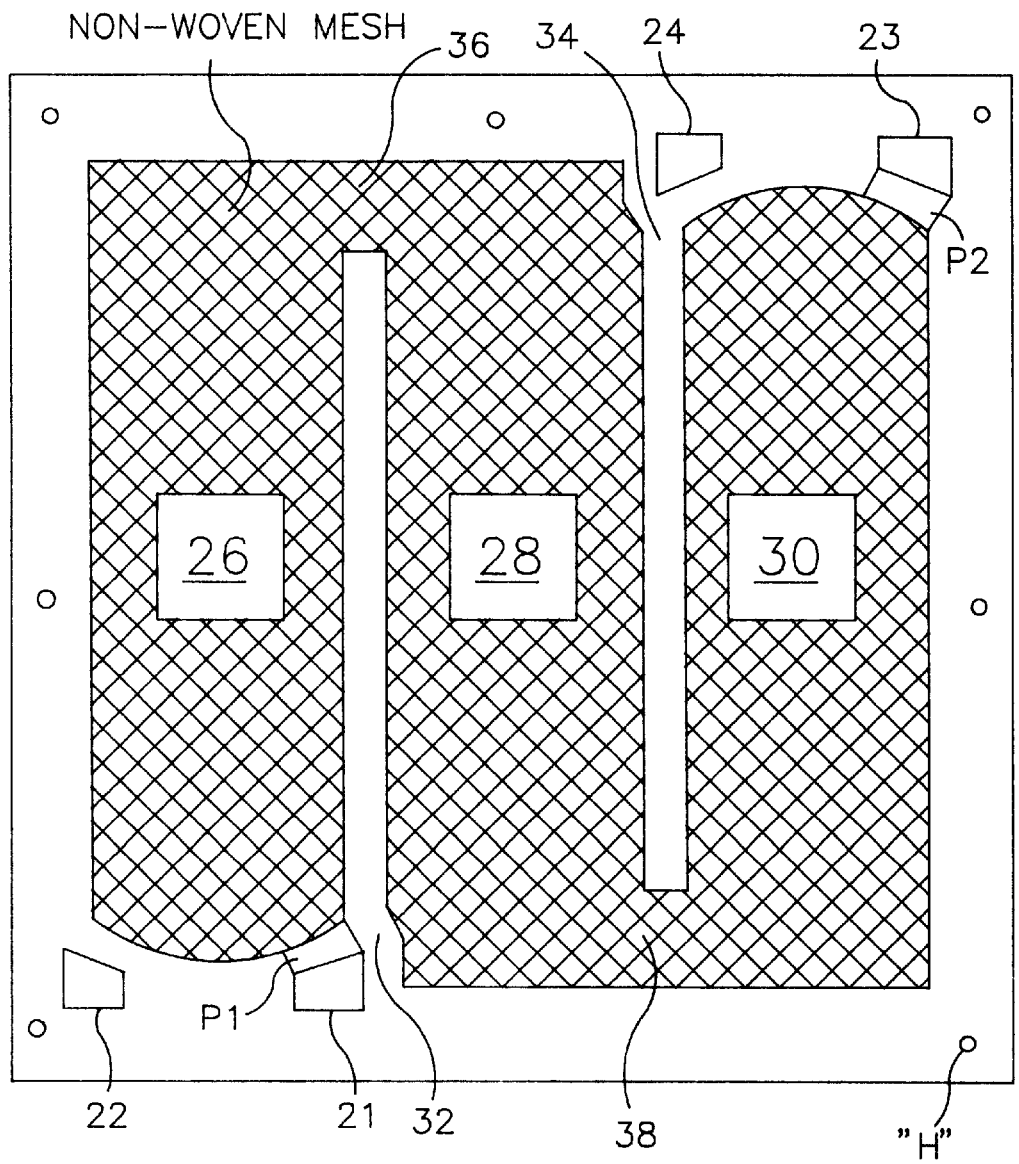
FIG. 1 is a plan view which shows an inventive gasket and a mesh support use in a two-compartment electrodialysis cell with an active area containing restrictor sections joining flow section to form a serpentine series flow path.

A gasket and other related apparatus carry out electrodialysis operations for chemicals recovery or conversion. The central area of the gasket is separated into two to eight multiple flow path sections having a substantially equal width. At turning points, the flow path sections are connected to each other by flow restrictors, usually forming 90° or 180° turns to provide a serpentine series flow path. The individual flow path sections are separated from each other by "ribs" of gasket material in the order 0.5–5 cm wide which provide support for confronting ion-exchange membranes. The membrane and the periphery of the gasket have substantially the same composition and thickness.

Each serpentine series flow path has two "ports" which provide entry and exit of the liquid stream. The width of the series flow path is in the order of 10–49% of the overall gasket width. The series flow path is covered or filled with a suitable mesh material (preferably non-woven) and has a significant open area (>50%) for the flow of liquid and electric current. The resulting path has substantially the same overall thickness as the gasket and the gasket and mesh materials are chemically resistant to the fluid being processed. The linear flow velocity in the flow path is usually in the range of about 7–15 cm/sec. The flow restrictors between the individual flow path sections may be the mesh material itself; or, it may be an additional port, with the width of the restrictor being about 20–90% of the total flow path width.

The gaskets contain manifold holes which align to form channels or conduits which deliver the liquids into and out of the individual gasket as well as to provide conduits through the stack for distributing the fluid to all of the parallel cells in the electrodialysis stack. There are two manifold holes per series flow path per processing stream.

When the electrodialysis cell is assembled, the gaskets themselves may be made of either a single soft material (e.g. low density polyethylene) or a composite comprising a harder core (e.g. polypropylene) laminates with a softer rubbery material such as styrene-butadiene rubber on one or both sides. The gaskets for any one stream are substantially uniform in thickness, e.g. about 0.5 mm to 4 mm.

The gaskets for different process streams may have different thickness. The ports in the gaskets nominally have the same overall thickness as the gasket itself. These ports have flat top and bottom surfaces and have an adequate rigidity to prevent their collapse under the applied stack closure pressure. The flat port surfaces are able to seal the ion-exchange membranes to the gaskets on either side of the port while maintaining a suitable flow channel between the port surfaces. The ports and the mesh materials may be attached to the gasket in any suitable manner for ease of handling.

The use of a gasket in an electrodialysis stack results in an improved process performance as measured by product recovery and purity, product throughput rate, hardware integrity, reduced recycle flow requirement, and reduced electrical shunt related losses. An improved version of such a stack uses a coated iridium oxide anode in an acidic environment (e.g. 5–10 wt % sulfuric acid).

DETAILED DESCRIPTION OF THE VARIOUS EMBODIMENTS

FIG. 1 shows the construction of a gasket for use in an exemplary two-compartment cell. The eight holes (such as H) in the periphery of the gasket provide a means for aligning and clamping together the various gaskets and membranes in the electrodialysis stack. The gasket has two manifold holes 21 and 23, through which a first fluid process feed stream enters and exits the gasket. Two other manifold holes 22 and 24 provide the "piping" connections for a second process stream. The gaskets are of uniform thickness to ensure a good mating and sealing with the adjacent ion exchange membranes. To minimize electrical IR resistive power losses, the gasket is made as thin as practical, typically 0.5 to 3 mm.

In FIG. 1, the fluid feed stream solution enters the active area of the gasket via manifold 21 and the port P1. Here, the active area comprises three flow path sections 26, 28, 30 connected in series to form a serpentine flow path, although two to eight flow path sections may be connected in series. The widths of the individual flow path sections in FIG. 1 (2.875" in a 13"×13" gasket of this particular example) constitute about 22% of the overall gasket width. The path should be wide enough to accommodate the manifold holes and ports that feed the gaskets as well as to provide an adequate space between the holes for a good seal between the gasket and the other membranes and gaskets in the electrodialysis stack. The area of the manifold hole is determined by hydraulic considerations such as the volume of liquid per gasket and the number of parallel gaskets in a face to face orientation in a given stack.

Another important determining factor is the amount of shunting electrical current that flows through the various manifolds in the electrodialysis stack. In effect, this shunt current is not available for the electrodialysis process and, in essence, is a process inefficiency. The amount of shunt current is directly related to the ratio of the total manifold area to the active area in the gasket. From the stand point of reducing this inefficiency, the manifold area should be made as small as practicable.

The flow path in the gasket should be narrow enough to provide both good flow distribution and turbulence as a result of fluid entry from a single port. Also, the narrower flow path improves the mechanical support for the membranes, since the greater amount of this remaining gasket material at the edges and the ribs separating the flow path sections provide this support. In absolute terms the flow path width may range from 2.5" to 12" and preferably 2.5" to 10" and constitute 10–49% of the gasket width. Too narrow a flow path does not provide an adequate separation of the manifolds and results in poor usage of the membrane, while too wide a flow path leads to poor liquid flow distribution and an inadequate membrane support for many of the commercially available membranes.

In order to improve the fluid distribution, a polymeric mesh material is placed in the flow path. The overall thickness of the mesh is approximately the same as the thickness of the gasket itself and is preferably a non-woven type of mesh. The mesh which must permit free flow of fluids as well as elasticity as well as the gasket are made of a polymer that is chemically stable relative to the materials being processed in the electrodialysis stack. Materials that are suitable include polyethylene, polypropylene, polytetrafluoroethylene and polyvinylidene fluoride. Suitable mesh materials are commercially available from Nalle Plastics and Applied Extrusion Technology. A typical mesh density is 8–16 strands per inch, with the preferred density being 10–12 strands/inch. The superficial linear velocity for the solution in the flow path is in the 7–20 cm/sec range, with 7–15 cm/sec being preferred.

The bulk of the electrical input to the electrodialysis stack is converted to heat, which results in an increased temperature of the process streams, especially at the outlets of the stack. For mechanical integrity and membrane stability, the overall temperature increase should be limited to around 20° C. The temperature increase is determined by the applied electrical current density and the active membrane area, by the electrical resistance of the stack components (membranes and solution compartments), by the number of process streams, and by their fluid flow rates. These factors, coupled with the width and length of the flow path sections determine the number of flow path section that can be connected in series in an electrodialysis stack. For example, four flow path sections can be safely connected in series for a two-compartment stack using 0.75 mm thick gaskets and operating with an electrical current density of 100 mA/cm$^2$ at a unit cell voltage of 3.5 V, a linear fluid velocity of 10 cm/sec, a path length of 34" (86 cm), and a path width of 9.5" (24 cm).

The individual flow path sections are separated from each other by ribs 32, 34 formed by appropriate cut outs in the gasket raw material and, therefore, have a thickness which is the same as the thickness of the overall gasket. The ribs are wide enough to provide an adequate support for the adjacent membranes, as well as to provide an adequate sealing and separation for the individual flow path sections. Still, the ribs should be kept as narrow as practical in order to maximize the usable membrane area. The rib width can be in the approximate range of 0.25 cm to 4 cm, with the preferred range being 1 to 2.5 cm.

The individual flow path sections 26,28,30 in FIG. 1 are placed next to one another and are connected to each other through flow restrictor sections 36, 38. In reality, these restrictor sections are additional or secondary ports and preferably are filled with a mesh material which is the same mesh material that is used in the flow path itself. Alternatively, one may use a denser mesh (e.g., one with 12 to 30 strands per inch) or may provide ports of the same design as port P1.

The width of the restrictor sections 36, 38 may be 20 to 90% of the width of the flow path sections, preferably in the 30 to 500 range of the flow path width. The length of the flow restrictor sections 36, 38 is the same as the width of the ribs 32, 34, but in principle could be somewhat shorter or longer. Since the width of the restrictor section is less than the width of the flow path sections, the velocity of the fluid increases as it passes through the restrictor. This means that the fluid pours into the next fluid flow section with great turbulence which agitates the fluid in that section. Hence, as a secondary port, the restrictor is designed to ensure a good fluid flow distribution within the individual flow path sections and to eliminate "dead corners" within the flow path. The shape of the restrictor section may be rectangular as shown in FIGS. 1–4, trapezoidal, progressively constricting or venturi-Double V shaped for better pressure recovery.

After circulating through the serially connected flow path sections 26, 28, 30, the process solution exits through the port P 2, and manifold hole 23.

Preferably, ports P 1 and P 2 are of same design; some examples of suitable designs being shown in FIGS. 5(a)–5(e). The top and bottom of the port are flat surfaces. The ports are made of a material that is rigid enough to avoid collapsing their interior flow channels when under a stack closure force. The ports are able to readily seal against the adjacent membranes as does the gasket material surrounding the ports. Depending on the particular design, the port may be a composite formed of several layers; or it may be made of a single piece. The overall finished port is of approximately the same thickness as, but may be more rigid than, the gasket.

In greater detail, FIG. 5(a) shows a port fabricated from a single piece of a material 40 such as polypropylene or polytetrafluorethylene with many circular holes 42 extending therethrough to provide channels for fluid flow from the manifold hole to the series flow path. FIG. 5(b) shows a port design similar to that of 5(a), but with soft outer surfaces 44, 46 to improve surface sealing with the ion-exchange membranes. These softer layers should be stable relative to the chemicals being processed. They may be a material such as low density polyethylene or styrene-butadiene rubber, for example.

FIG. 5(c) shows a port design which has square or rectangular channels 48 in the central section 50. Such a port is readily formed by grooving a series of channels in a piece of plastic 52 that is approximately half as thick as the gasket, cutting it into sections of the appropriate port length, and overlaying pairs of the rectangular channel. The two halves may be glued or welded together if necessary. Care should be taken to ensure that the wall thickness of the finished piece is adequate to provide the requisite port rigidity.

FIG. 5(d) shows a port having a composite construction. Here, a piece of non-woven mesh material (preferably of higher mesh density than that used in the flow paths) is sandwiched between two layers of a polymer such as polypropylene or polytetrafluorethylene. The higher mesh density causes the fluid to flow faster through the restrictor in order to create a turbulence in the next fluid flow section to insure a good flow distribution. It also provides a more rigid support for the top and bottom surfaces. The polymer for the top and bottom surfaces is used in film form and has a thickness of 0.005"–0.01" to provide an adequate rigidity. FIG. 5(e) is a composite port made of multiple layers of the polymer film and non-woven mesh film material. This port may be suitable for use with thicker gaskets.

The composite ports shown in FIGS. 5(c), 5(d) and 5(e) may also have softer top and bottom layers as shown in FIG. 5(b). Still other suitable designs can be visualized by people skilled in the art.

Figure 2:
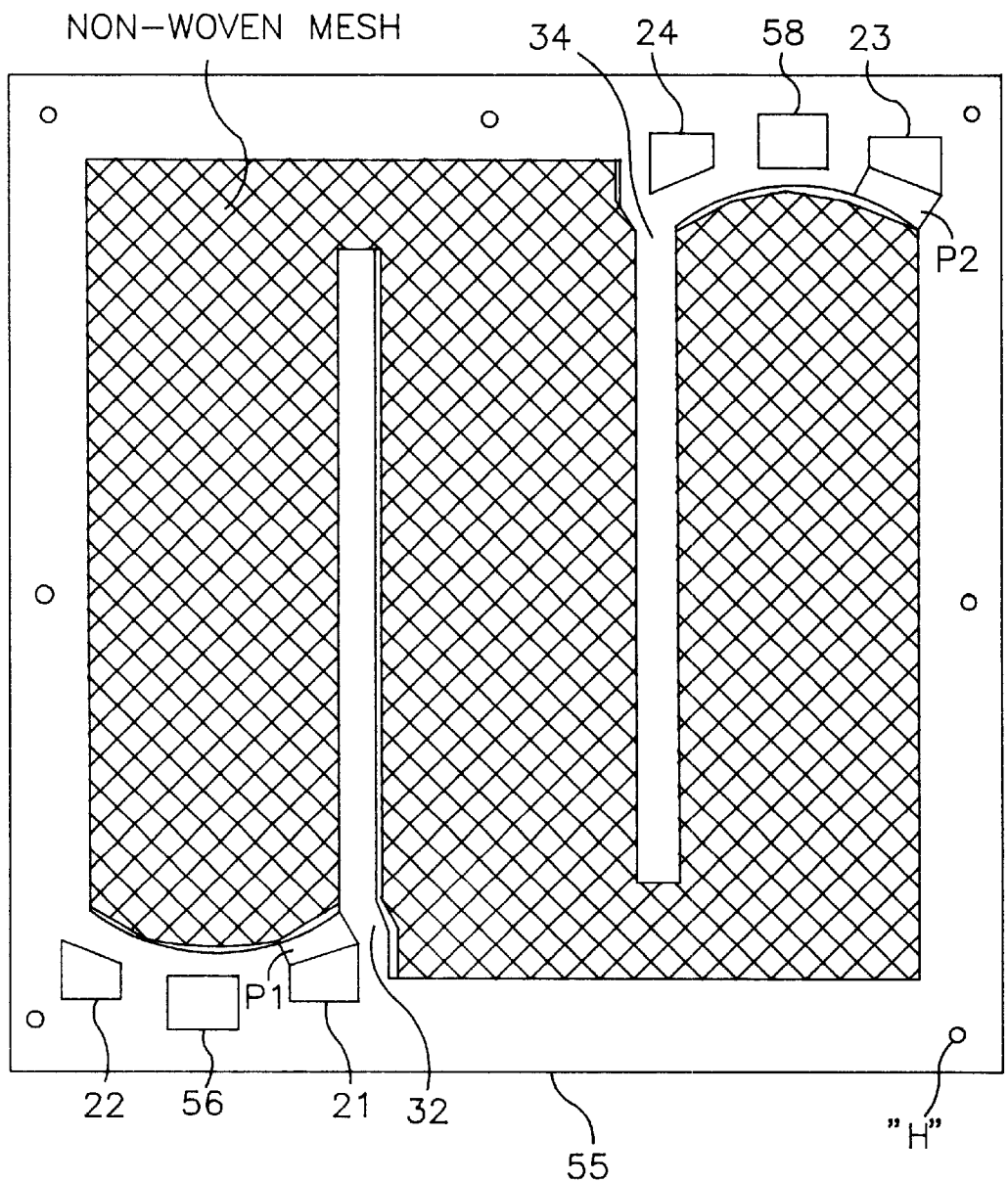
FIG. 2 shows an inventive gasket for use in a three-compartment cell.

FIG. 2 shows a gasket 55 that can be used in a three-compartment electrodialysis stack. It is similar to the gasket in FIG. 1, except that it has two added manifold holes 56, 58 in order to provide for a total of three process streams.

Figure 2A:
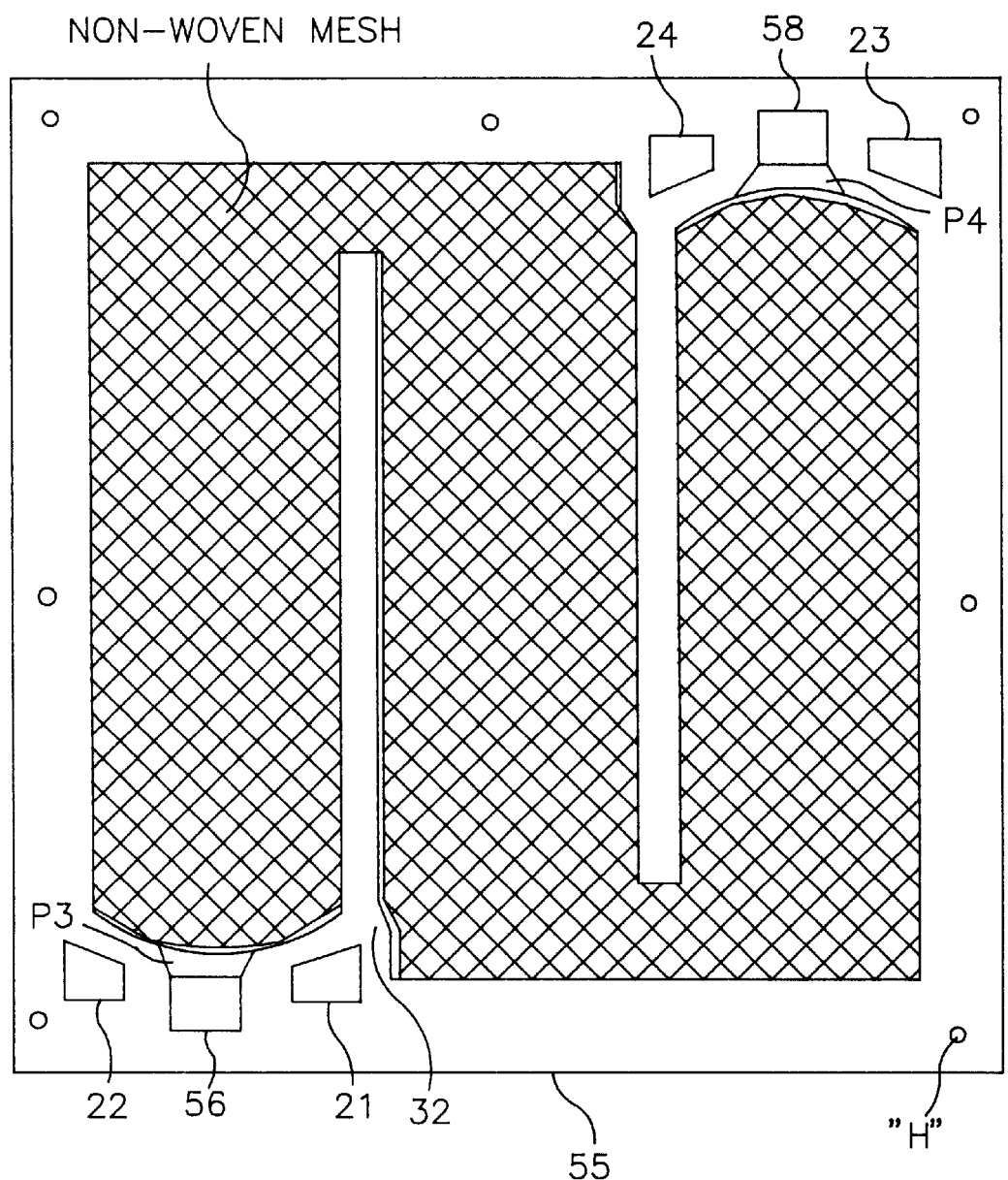
Figure 2B:
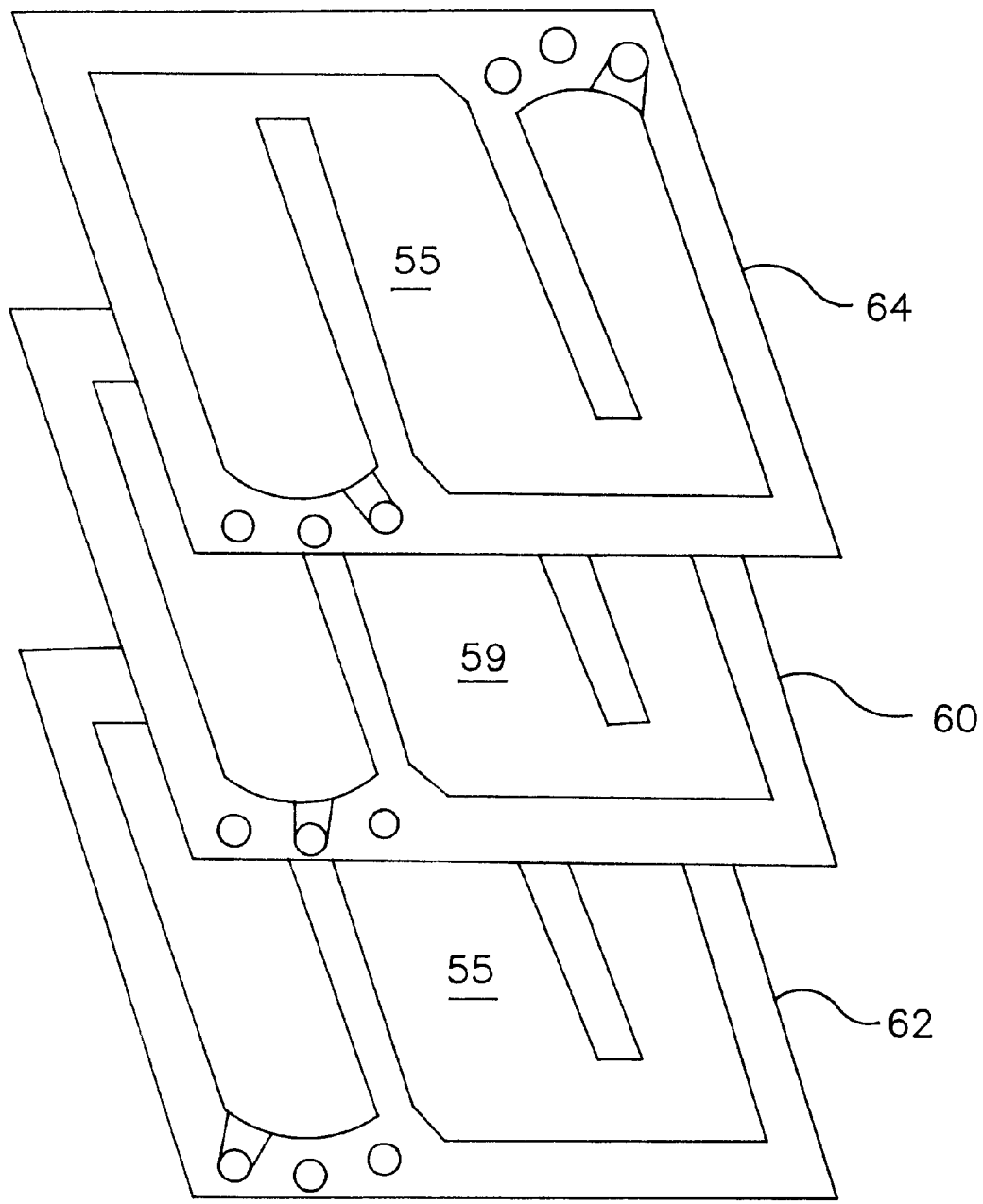

FIG. 2(a) shows the same gasket 59 but with the ports P3, P4 associated with the middle manifold holes 56, 58. This is the "different" gasket as pointed out above. Also as pointed out above, the manifold holes 21, 22, 23, 24 in FIG. 2(a) are not connected to a series flow path. Instead, they provide conduits to downstream gaskets as that shown in FIG. 2. For a three compartment cell assembly FIG. 2(b), one gasket 60, as shown in FIG. 2(a), and two gaskets 62, 64 as shown in FIG. 2 are provided, with one of them (62) rotated 180° so as to form the third process loop.

Figure 3:
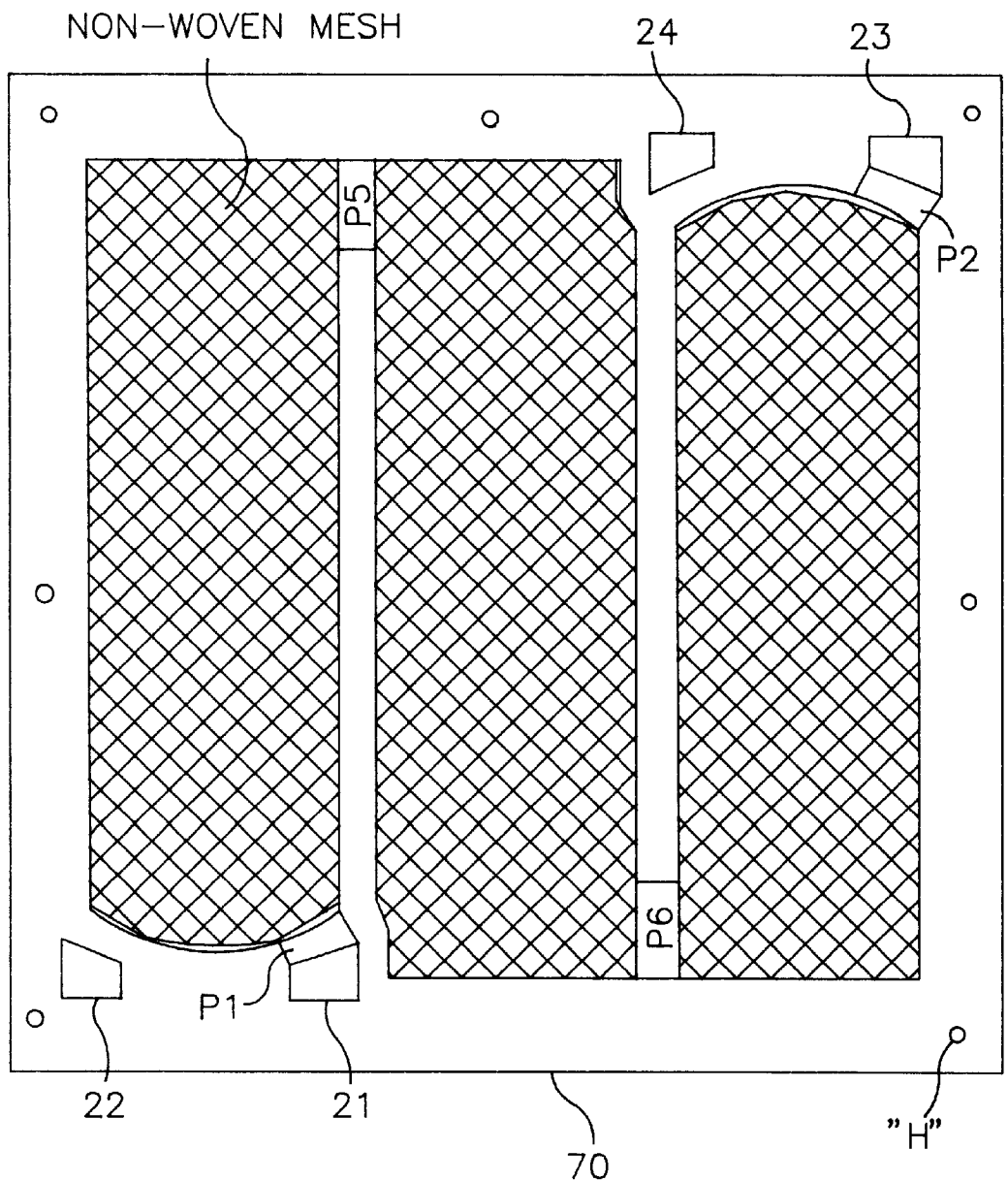
FIG. 3 shows an inventive gasket with additional ports located between the flow path sections in order to form a serpentine series flow path.

FIG. 3 shows a gasket 70 which is similar to the gaskets 55, 59, but with additional fabricated ports P5, P6 located at and providing the flow restrictor functions between flow path sections. These ports, unlike ports P1 and P2 can be any fluid distributing device with the same overall thickness as the gasket itself. As such it could be of the same design (FIGS. 5(a)–5(e)) as ports P1 and P2; or, it could be of some other design such as a denser non-woven mesh, a set of parallel channels cut in a piece of thermoplastic or thermo-setting polymer, etc.

Figure 4:
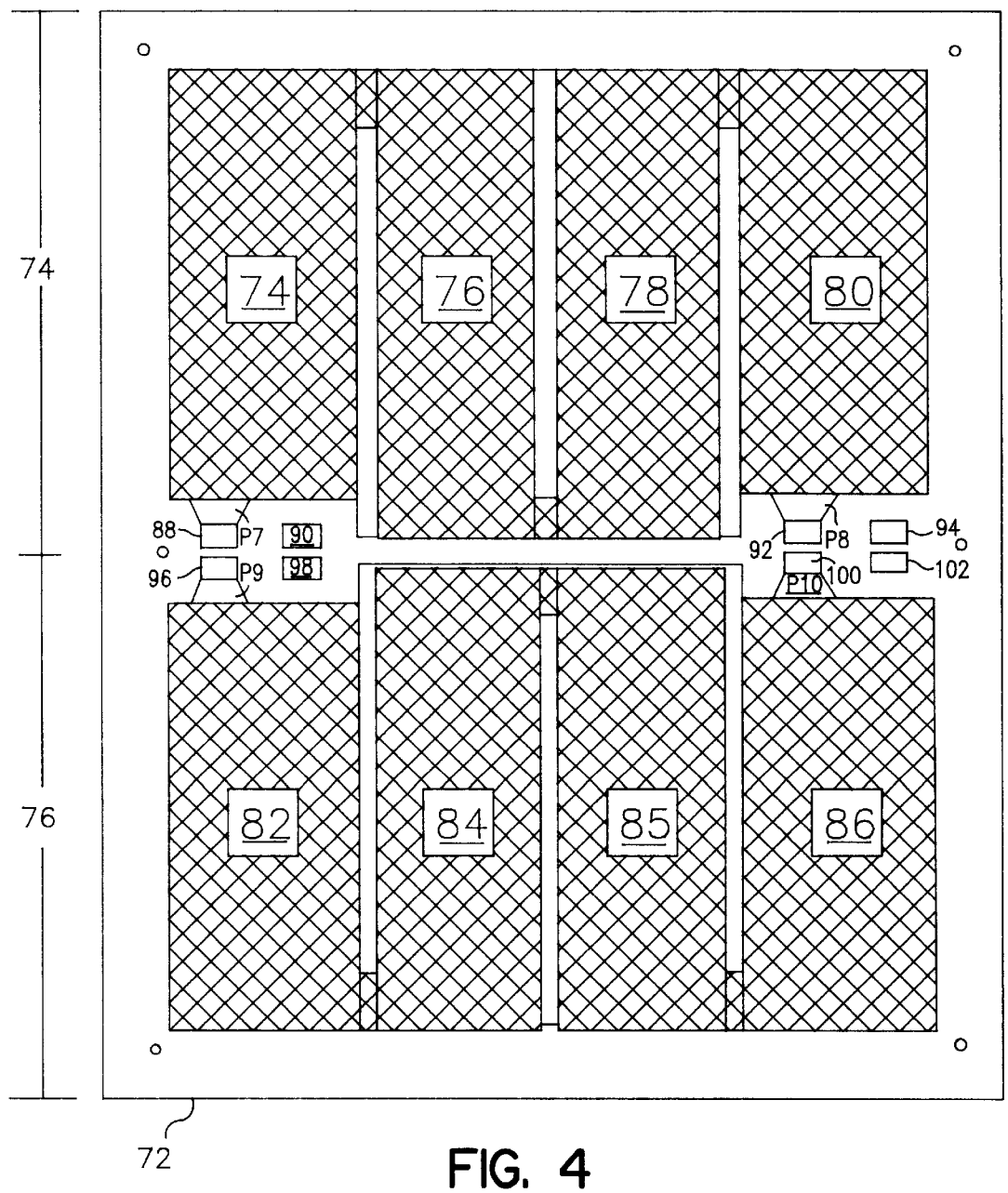
FIG. 4 shows an inventive gasket having an active area containing two separate series flow paths and two separate sets of manifold holes.
Figure 6:
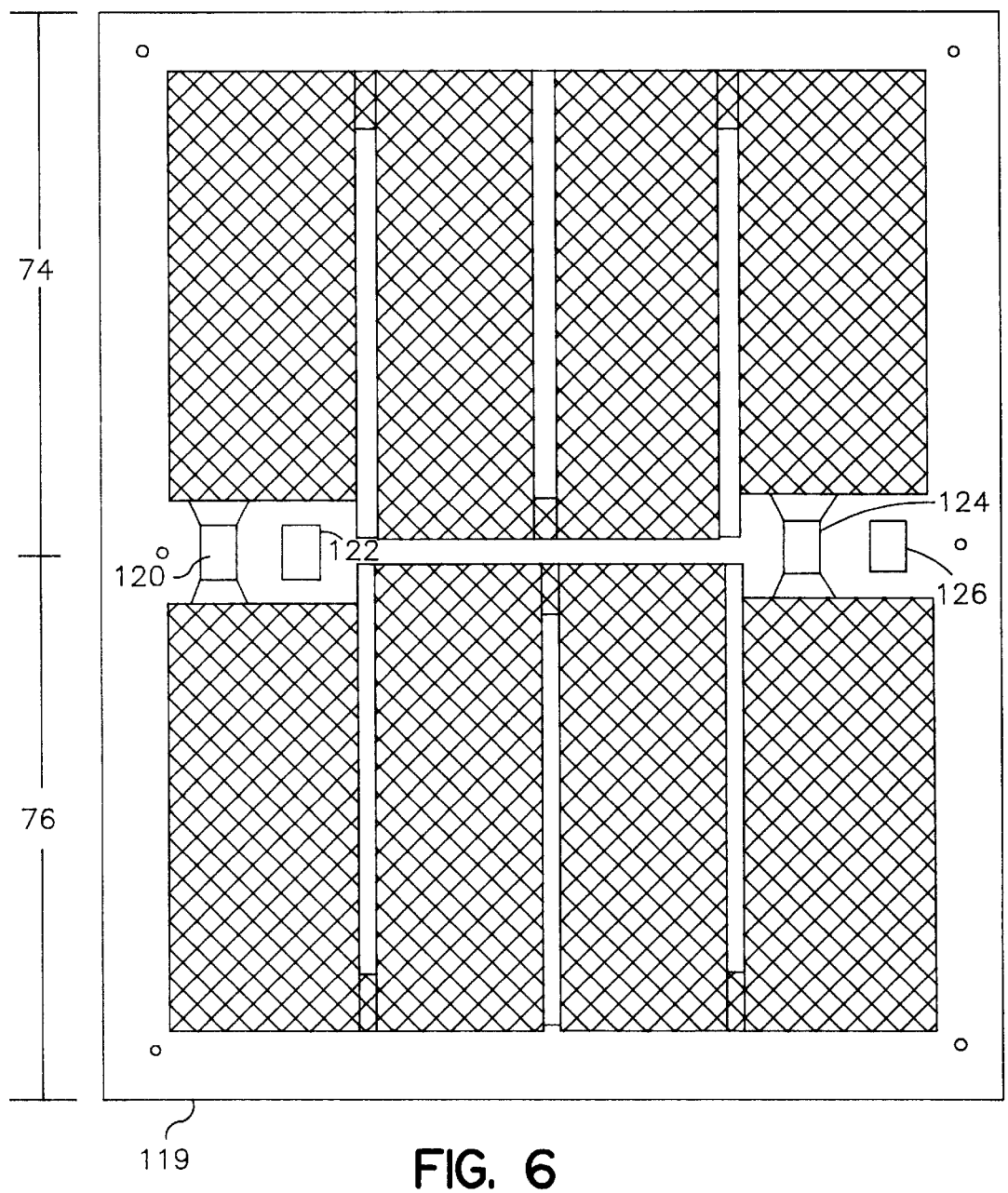
FIG. 6 shows an active area with a two-compartment gasket having two separate series flow paths that are connected to common manifolds.
Figure 7:
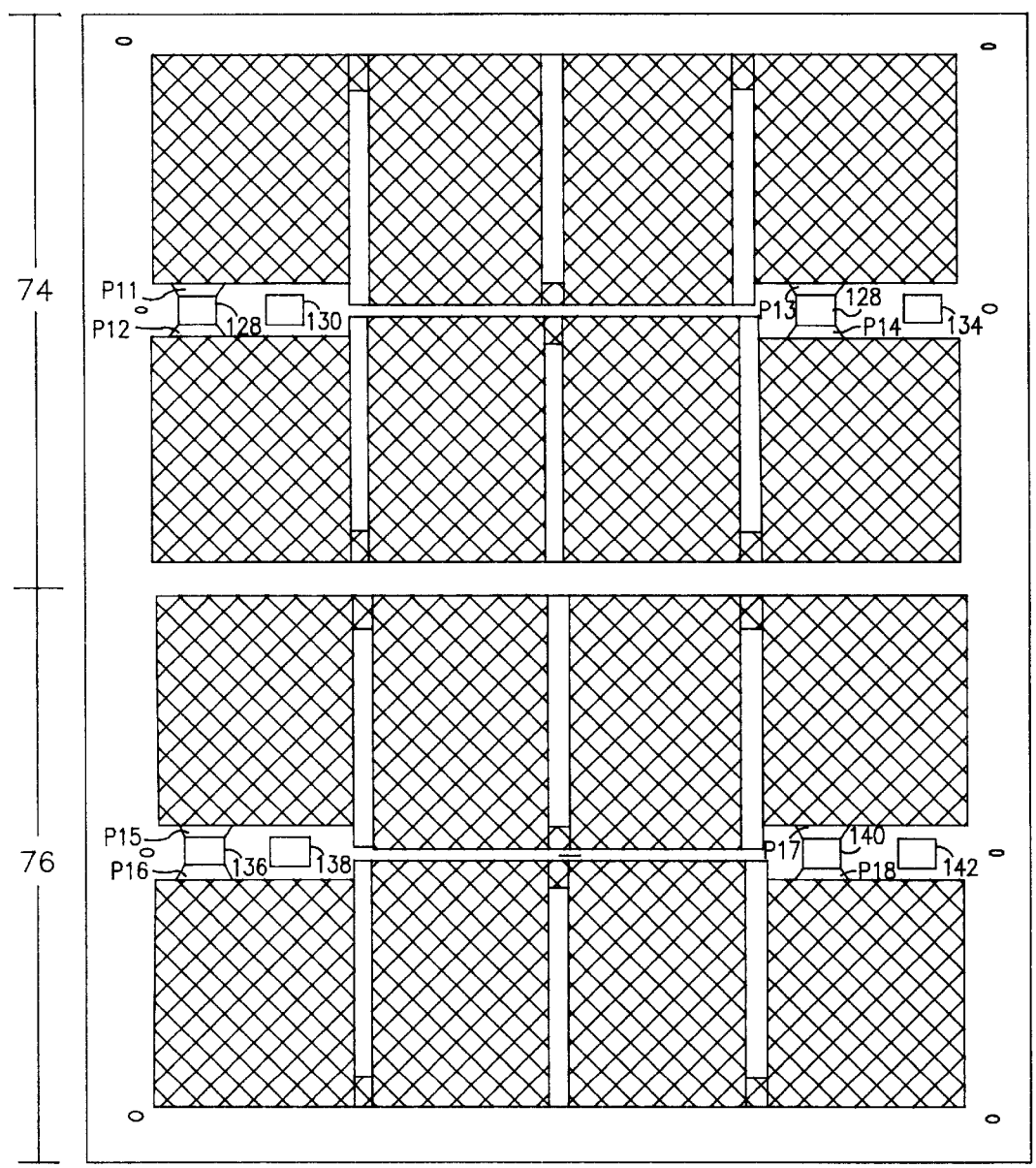
FIG. 7 shows a gasket having an active area with two-compartments having four serpentine series flow paths.

FIGS. 4, 6 and 7 show the various constructions of gaskets with multiple series flow paths. Such constructions are particularly useful for large scale applications which require gaskets in the order of 1 m×1 m or bigger. In essence the construction is made modular within the gaskets.

FIG. 4 shows a two-compartment cell gasket 72 which has two serpentine series flow paths 74, 76, each with four flow section channels 74–80 and 82–86, respectively, connected in series. A total of eight manifold holes 88–94 and 96–102, respectively, along with 4 ports P7–P10 are used to supply the feed stream and withdraw the product from the electrodialysis stack. This arrangement enables the two halves 74, 76 of the gasket either to operate in parallel or to function as two separate and independent stages.

Figure 11A:
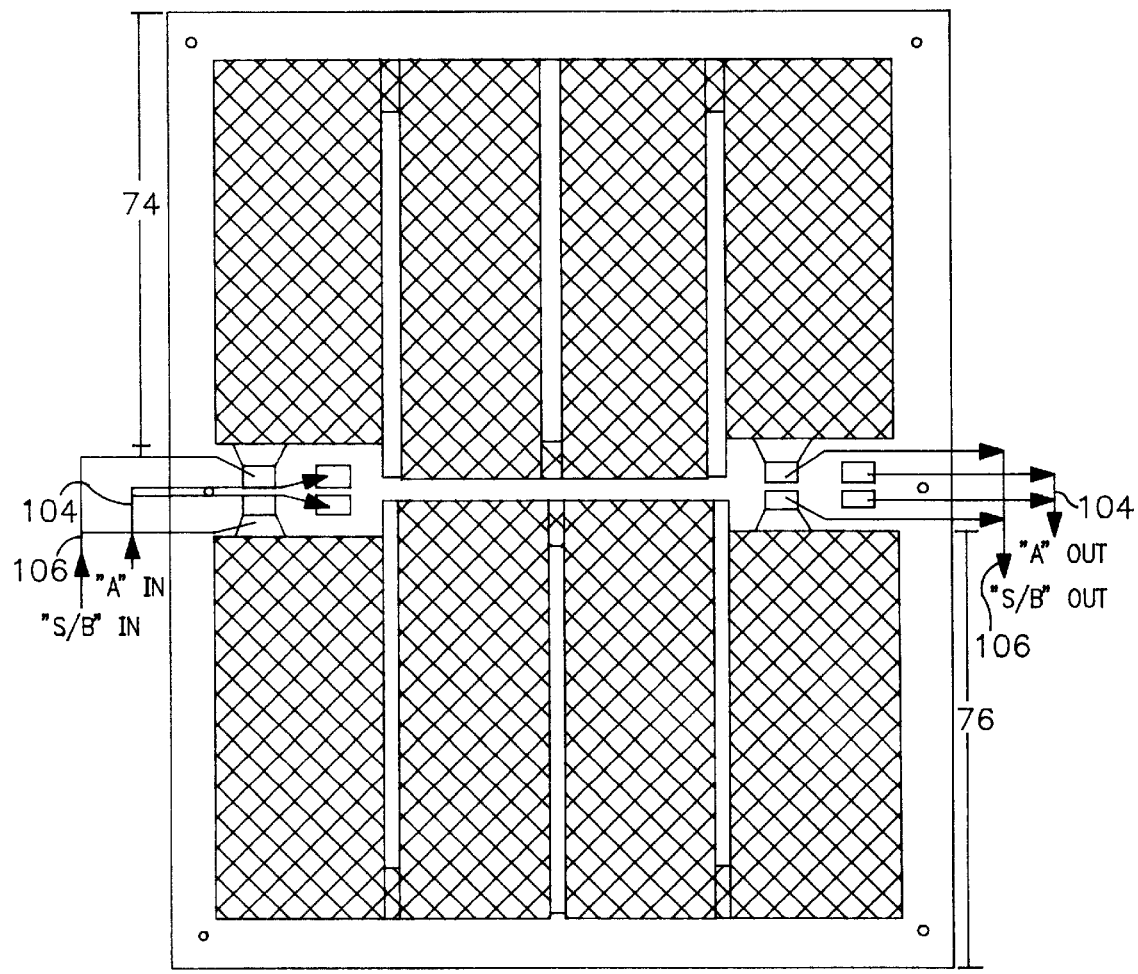
FIGS. 11(*a*)–11(*c*) show some of the possible flow paths for a two-compartment gasket.
Figure 11B:
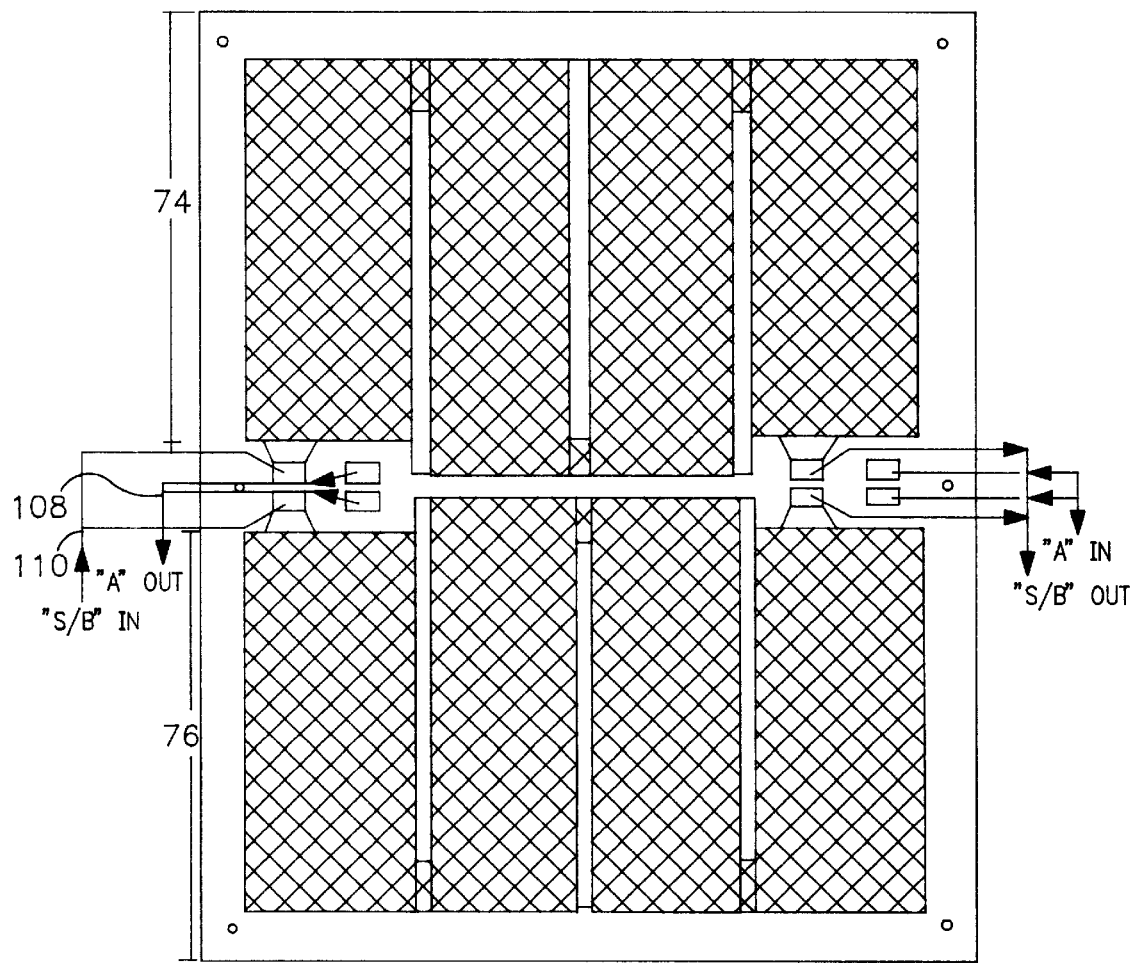
Figure 11C:
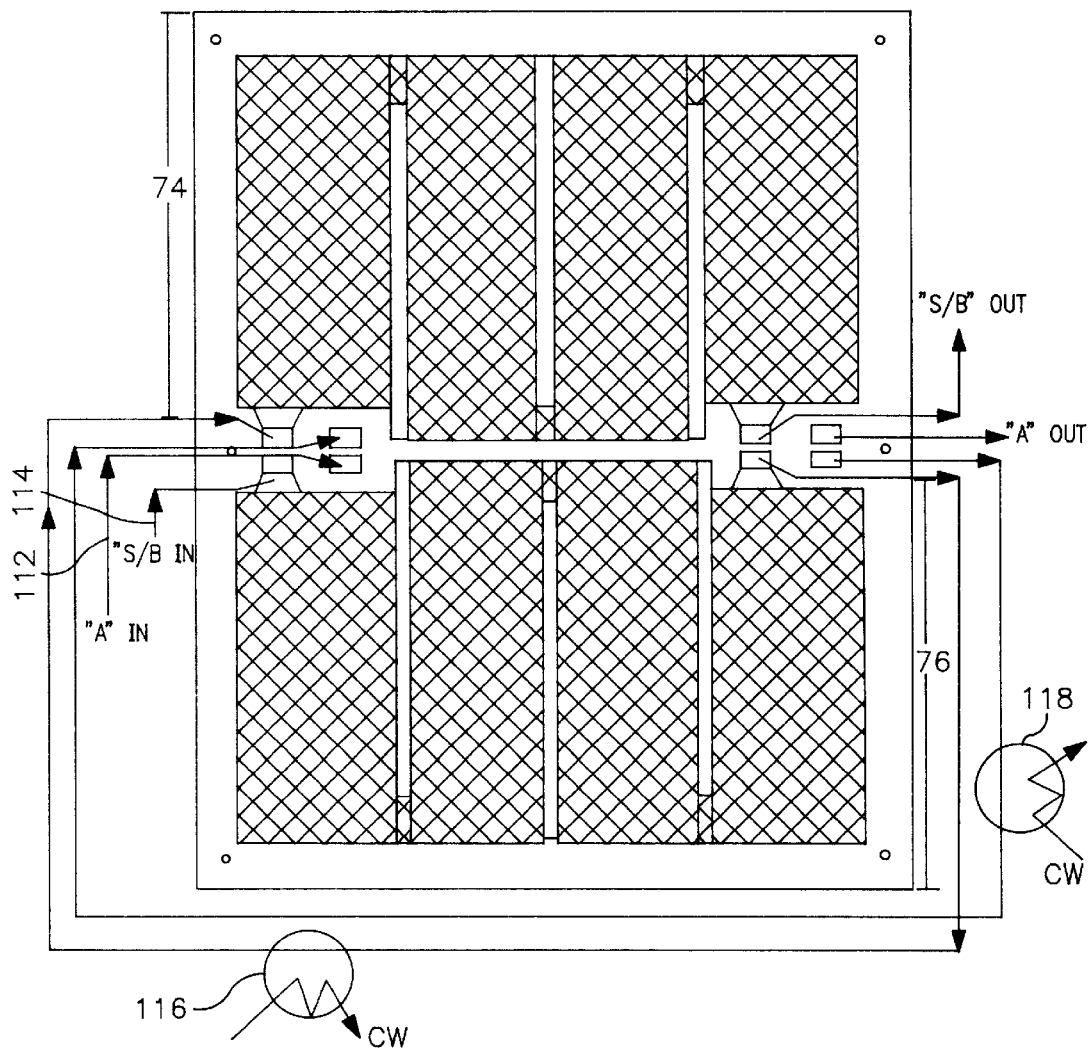

FIGS. 11(*a*)–11(*c*) show some of the possible flow paths in a two-compartment cell such as that shown in FIG. 4. FIG. 11(*a*) shows parallel connection of the two stages 74, 76. There are flows of the acid (A) 104 and salt/base (S/B) 106 streams in the two series flow stream paths 74–76. This co-current flow provides a minimum of differential pressure between the process streams and is, therefore, the least stressful on the ion-exchange membranes.

The flows of the A and S/B streams 108, 110 (FIG. 11(*b*)) are countercurrent. These countercurrent flow arrangements provide a fairly good matching of pressures between the streams and in certain applications can yield higher process efficiency.

FIG. 11(*c*) shows the two stages 74, 76 connected in series with the flows of the two streams 112, 114 being co-current. Such a process hookup increases the conversion of, say, the available sodium chloride in the salt loop of a three compartment cell. An option intercooler 116, 118 is shown coupled between the two stages in order to keep the temperature increase within the design target.

Alternatively one can use common manifold holes 120–126 (FIG. 6) for the two halves of the gasket 119, thus placing the two series flow path 74, 76 in parallel during operation, and reducing the number of manifold holes to four 120–126. This gasket does not provide the option of having two independent stages, but has the advantage of having only four manifolds for the two series paths.

FIG. 7 shows a two compartment gasket 127 with four sets of series flow paths. A total of eight manifold holes 128–134 and 136–142, respectively, and eight ports P11–P14 and P15–P18, respectively, are used in this design. Each series flow path has four flow sections connected in series. If the electrodialysis process operates at lower current densities (i.e., lower heat generation), and when a higher conversion of the feed stream is desired, up to eight flow channels may be connected in series.

Other variations in the design will be apparent to those skilled in the art.

Figure 8:
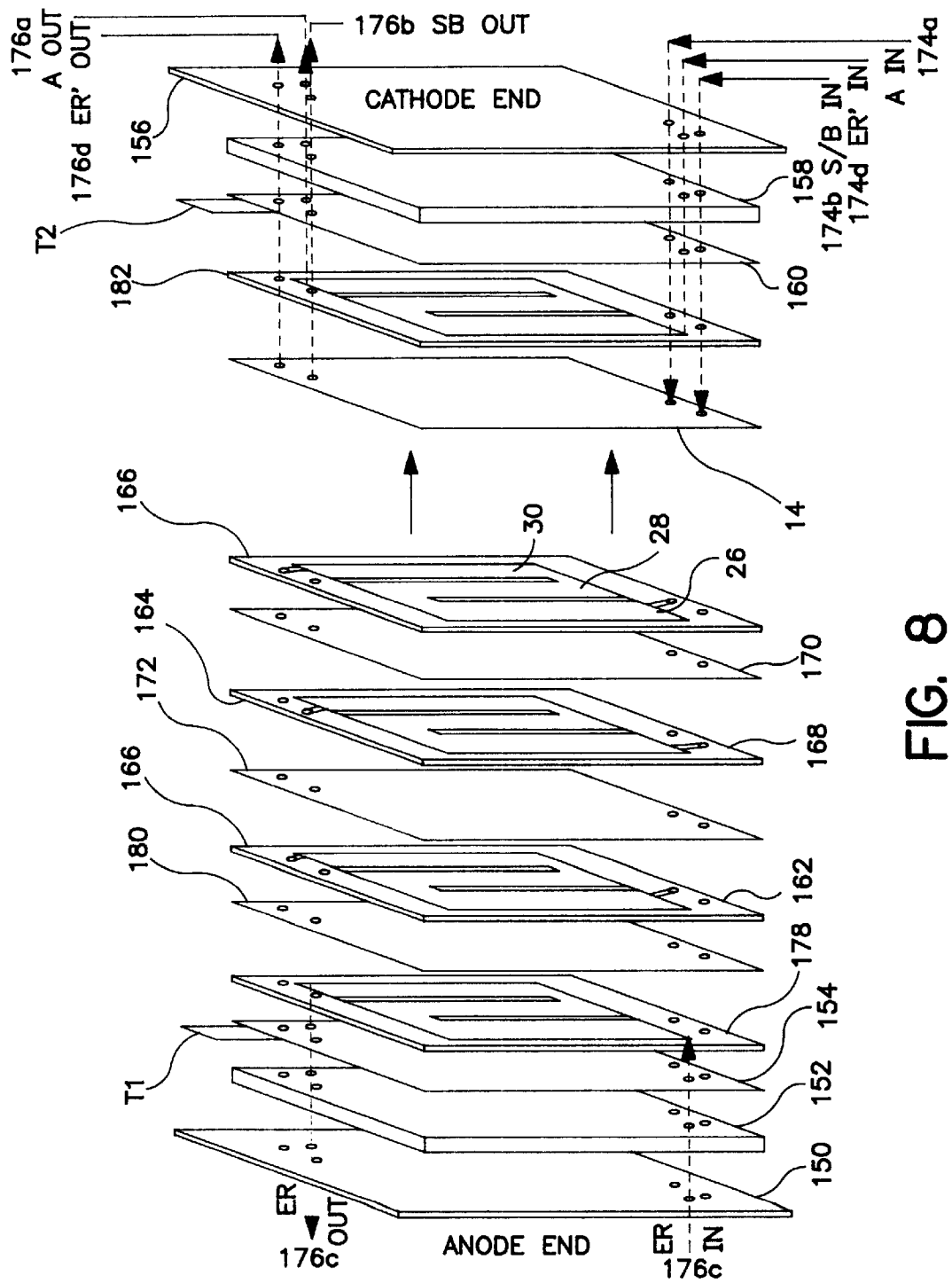
FIG. 8 is an exploded view of a stack using the inventive gaskets which will be clamped together in a face to face relationship.

FIG. 8 is an exploded view which shows a two compartment electrodialysis stack incorporating the gaskets of this invention. As here shown, the gaskets are the same as that of FIG. 1. The stack is assembled by using a set of aligning pins over which the holes H are fitted. The entire assembly is preferably held together by a set of clamping bolts and nuts (not shown). The size of commercial cell stacks would be much larger with 50–200 unit cells assembled between a set of electrodes. The gaskets may be as large as 1.2 m×2.5 m and may be held together by a filter press type unit that uses a hydraulic closure mechanism to provide the needed sealing pressure.

Starting at the anode end (the left side) of FIG. 8, the stack has a steel end plate 150 which may be 0.25–0.5" thick. Next in the stack are a polypropylene end plate 152 1–2" thick and an anode electrode sheet 154 ~0.062" thick, with rubber gaskets (not shown) placed in between these plates for improved sealing. The electrode may be made of platinum, platinum-coated on titanium, nickel; or, it may be a noble metal oxide coated on titanium. A nickel anode requires an alkaline medium while the other electrodes can function in acidic or neutral (non-fluoride) media.

A suitable metal oxide electrode is one with iridium-oxide coated on titanium. The iridium oxide electrode has been found to be particularly suitable for use in inorganic acid solutions that may contain small amounts of organic acids, such as in applications involving the processing of the salts of organic acids. It is therefore, a preferred anode for electrodialysis cell stacks processing organic salts.

A similar assembly of a steel plate 156, a plastic end plate 158 and a cathode electrode plate 160 is used at the cathode end. The cathode electrode material may be 316-stainless steel or a higher alloy, such as that sold under the trademark "Hastelloy" which is generally stable in either an acidic or alkaline media during the actual electrodialysis operation. The electrodes 154 and 160 have tabs T1, T2 for making connections to an external DC power supply. These electrodes may fit into cavities (not shown) within the plastic end plates 152, 158 or may have the same approximate overall dimensions as the end plates.

The gaskets and membranes are assembled between the two electrodes 154, 160. The acid (A) and base (B) compartments 162, 164, respectively, contain within the gaskets 166 and 168 and between the ion-exchange membranes (bipolar membrane 170, anion membranes 172, and cation membrane 180).

The process solutions enter the electrodialysis stack preferably from the cathode (the lower potential) end and are distributed to the individual chambers within the gaskets via manifold holes in the gaskets and membranes. The orientation of the gasket and the location of the ports determine which of the individual gasket is being fed. The acid A and salt base S/B solutions entering 174*a* 174*b* of each gasket flows through the flow path sections (e.g. 26–30, FIG. 1) that are connected in series. In the arrangement shown in FIG. 8, the flow of acid A and salt base S/B solutions in the A and B compartments 162, 164 is co-current. Process solutions exiting at 176*a* 176*b* from the individual gaskets are channeled through the exit manifold holes and out of the electrodialysis stack assembly at the cathode end.

The electrode rinse solutions ER 174*c*, 176*c* and ER" 174*d*, 176*d* are fed through separate loops. A cation membrane 180 prevents the anode rinse solution or anolyte ER which circulates from entrance 174*c* through the anode gasket 178 and out exit 176*c* from mixing with the main process solutions A and S/B. The end bipolar membrane 171 prevents the cathode rinse solution or catholyte ER' circulating through the cathode gasket 182 and isolates the rinse from the main process solutions A and S/B.

To further ensure that the electrode rinse solutions ER and ER' are properly isolated from the main process solutions a cation exchange membrane (not shown in the figure) may be placed adjacent to the cation side of the bipolar membrane 171. Alternatively an anion exchange membrane (not shown in the figure) may be placed adjacent to the anion side of the bipolar membrane 171. The cation and anion exchange membranes may be mechanically more durable than the bipolar membrane 171 and serve to prevent a bulk mixing of the electrode rinses ER' and the main process streams A, S/B, even if a relatively weaker bipolar membrane should rupture under the pressure differential between the main process solution and the electrode rinse stream.

Figure 9:
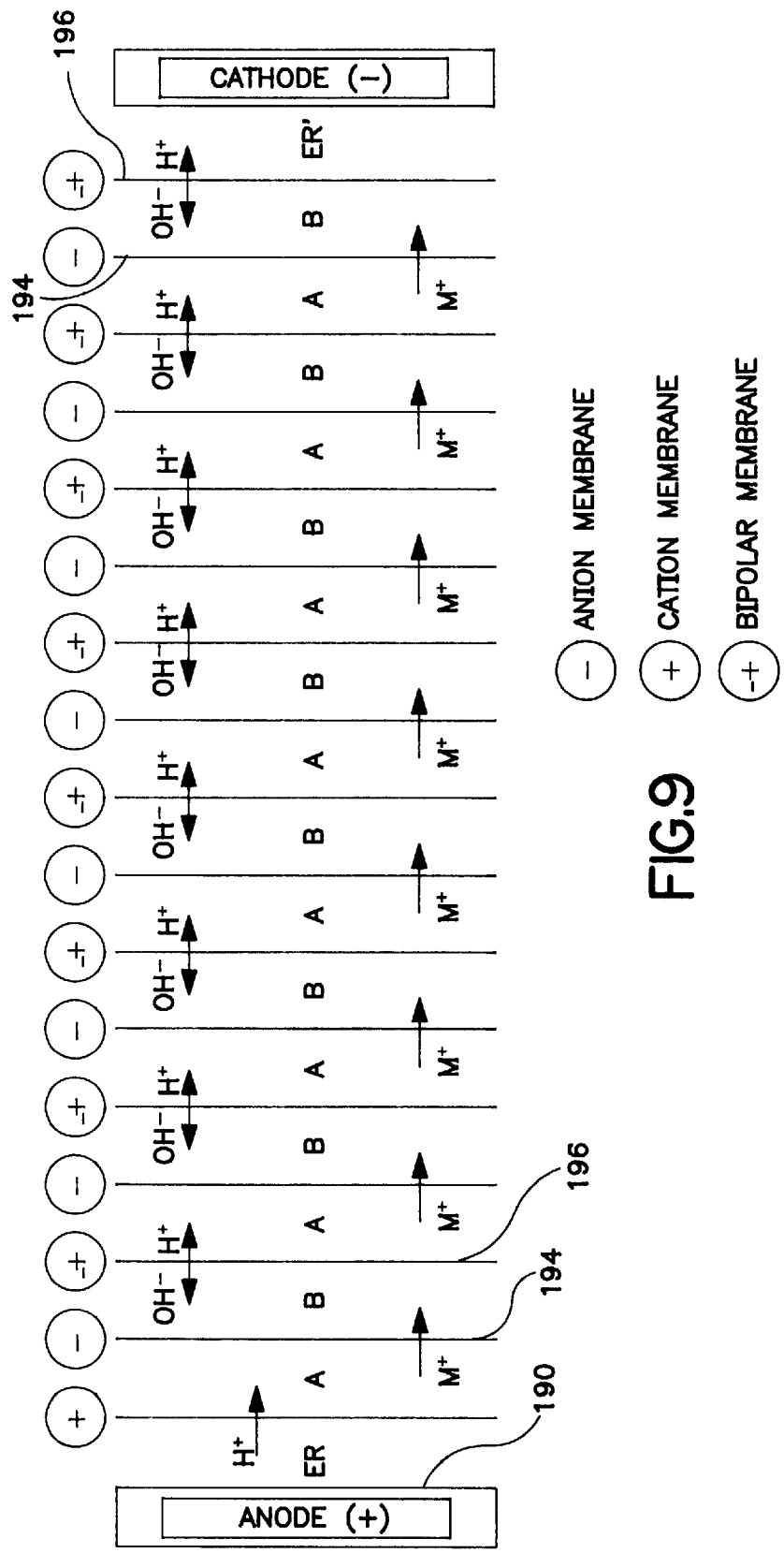
FIG. 9 is a schematic drawing showing the cell layout for a two-compartment anion cell.

The assembly sequence and operation of the process is best illustrated by FIG. 9 which shows a schematic diagram of a pilot cell assembly having eight unit cells, each containing an acid cell A and a salt/base cell B. Each of these two compartment cells A and B is constructed of two bipolar membranes (−+) which contain the cells A and B and anion (−) exchange membrane which separates the base B and acid A compartments. The base and acid compartments are supplied with the process solutions via the internal manifold holes formed in the gasket. The electrode rinse compartments at the anode and cathode ends, ER and ER', are supplied separately with an electrode rinse stream e.g., dilute sulfuric acid from a common supply tank.

The (+) cation membrane 192 at the anode end transports the hydrogen ions out of the ER chamber, while a nearly equivalent amount of hydrogen ions are generated at the cation surface of the bipolar membrane 196 and transported into the ER' compartment at the cathode end of the assembly. This arrangement balances the hydrogen ion ($H^+$) in the electrode rinse loops and maintains the electrode rinse concentration at a stable level for long operating periods.

The two-compartment anion cell configuration in FIG. 9 is particularly suitable for converting ammonium salts to ammonia and acid. The ammonium salt, $NH_4X$ is introduced into the B compartments, where it reacts with the hydroxyl ions generated at the bipolar membranes (+−) to form an ammoniacal solution. In the mean time, the anions $X^-$ are transported by the direct current driving force across the anion membranes (−) to the A compartments, where they combine with the hydrogen ions generated at the bipolar membrane to form the acid HX. The reactions can be summarized as follows:

Salt/base compartments: 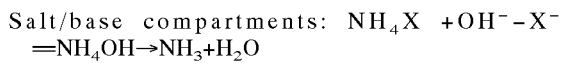

Acid compartments: $X^- + H^+ = HX$

EXAMPLES

The utility of the gasket of this invention is in improving the performance of the electrodialysis stack, which was studied in an ammonium lactate conversion application. The process uses a two-compartment cell incorporating bipolar and anion exchange membranes. In the process, ammonium lactate of a 30–45 gm/l concentration generated via fermentation is initially filtered to remove the microbial cells and insolubles. Subsequently, it is filtered using an ultrafilter or a nanofilter.

The resulting clear feed stream is fed to the salt/base compartment (B compartment) of the electrodialysis stack. Under a direct current driving force, the $OH^-$ ions generated at the surface of the bipolar membranes combine with the ammonium ions, generating ammonium hydroxide. The lactate anions are transported across the anion membranes and combined with the $H^-$ ions generated at the cation selective surfaces of the bipolar membranes to generate lactic acid.

Two experiments were carried out using the pilot cell of FIG. 9 incorporating the gaskets of this invention. The two compartment cell contained eight cell units. The gaskets used in the cell stack were 0.76 mm thick. Each gasket had an active area of 465 cm² (0.5 ft²), through which a direct current was passed. The stack contained an anode 190 made of ruthenium oxide coated on a titanium substrate supplied by Electrode Products Inc. The electrode rinse compartment ER used an MC 3470 cation membrane 192, from Sybron Chemicals, and seven repeating cells including compartments A and B used AMV or AMT anion membranes 194 from Asahi Glass Company. The bipolar membranes 196 were obtained from Aqualytics, a division of Graver Water. The seventh bipolar membrane was followed by an acid compartment A, anion membrane 194 (AMV or AMT), a base compartment B, another bipolar membrane 196, an electrode rinse compartment ER', and a stainless steel cathode 198. Using port designs shown in FIGS. 5(d), 5(e) in the acid and base compartment gaskets A, B, leak-free assemblies were readily realized.

Figure 10:
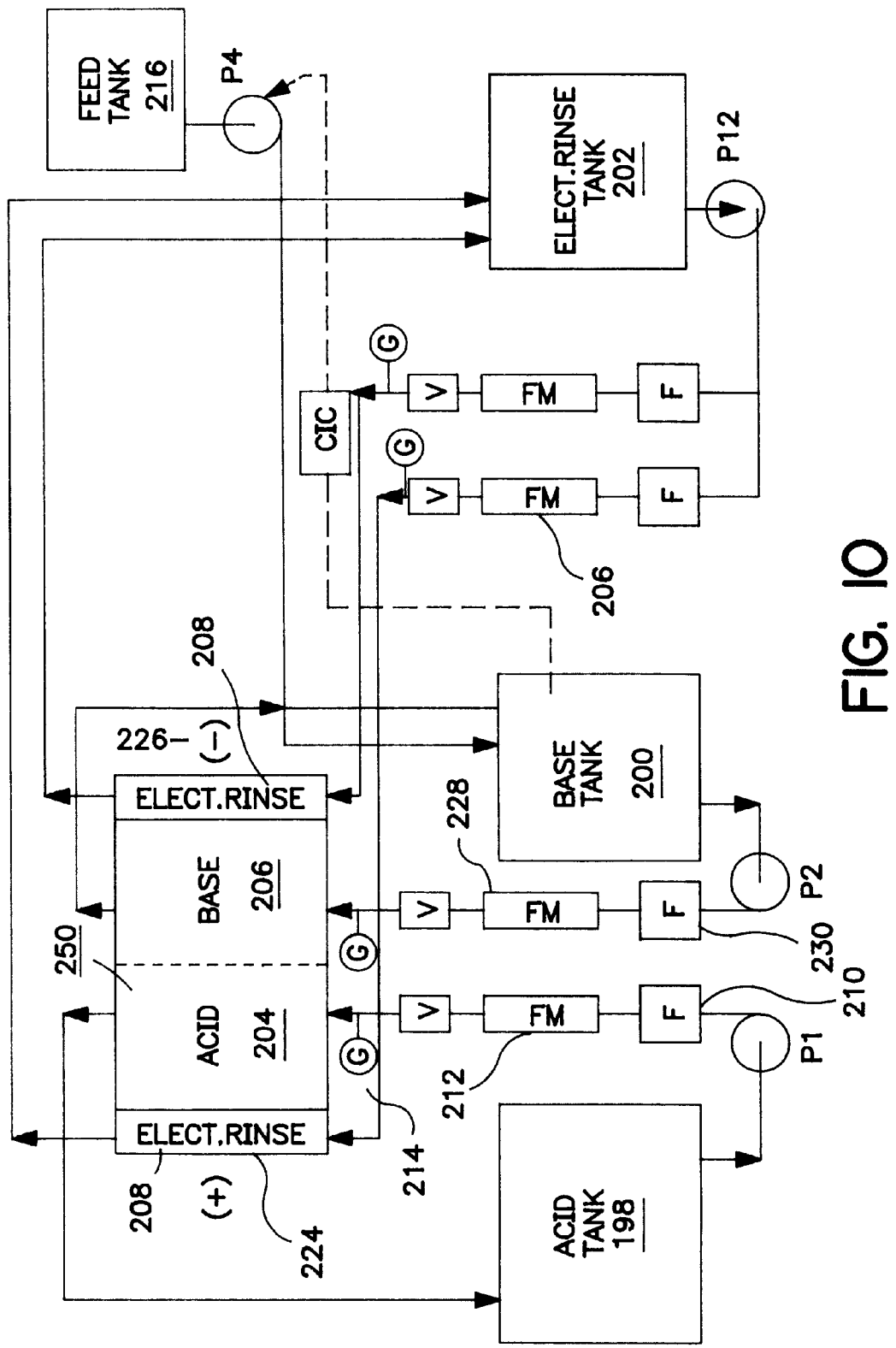
FIG. 10 is a block diagram which shows a pilot electrodialysis system for testing the inventive electrodialysis stack.

The inventive stack was placed in the system schematically shown by the block diagram in FIG. 10 in order to carry out the electrodialysis process. Three pumps (P1–P3) were used to circulate solutions from their respective recycle tanks 198, 200, 202 to the acid, base, and electrode rinse compartments 204, 206, 208 at a rate of ~2.5–3.5 1/ min. This translates to a superficial velocity of 7–10 cm/sec in the acid and base loops. Diaphragm valves, cartridge filters 210, flowmeters 212, and pressure gauges 214 were used to ensure a flow of clear fluids at known flow rates and pressure drops in the three loops. Coupled to a feed tank 216 was a feed pump P4 used to supply the ammonium lactate feed stream to the base recycle tank 200 via a conductivity controller CIC. A DC power supply was connected to the anode and cathode terminals 224, 226, respectively of the stack. The requisite controllers for the current and voltage input were located in the power supply itself.

The system was initially charged with the filtrate (feed ammonium lactate) in both the base and acid recycle tanks 200, 198. The electrode rinse tank was charged with ~8 wt % sulfuric acid. Recirculating pumps P1–P3 were started and the flows adjusted in order to get a pressure drop of 4–7 psi. For the most part, a flow of 3.2 1/mm (superficial velocity of 9 cm/sec) was maintained at a pressure drop of ~5–6 psig (~0.3 5–0.4 bar). This is a rather low pressure drop considering the total path length of 30" in the gasket, indicating that the pressure recovery between the up and down segments of the series flow path is surprisingly good, and representing a significant improvement over the commercially available apparatus using tortuous flow design. Therefore, the excellent pressure recovery between the up and down legs of the series flow path enables the use of a countercurrent flow in the cell stack if so desired without undue risks of membrane breakage.

Example 1

A sixty-five day test was carried out by using the pilot cell assembly (FIG. 9) to process an ultrafiltered (200,000 Daltons nominal rating) feed stream. The eight cell unit had bipolar membranes and AMV anion membranes. The test was operated at a direct current input of 14.5 A (29 A/ft² current density). A feed supply of ammonium lactate at a conductivity of 25 mS/cm and containing 35–50 gm/i lactic as ammonium lactate was metered into the base recycle tank 200 at a rate adequate to maintain the tank conductivity at ~10 mS/cm. The base product at a pH of 9.5–10 (ammoniacal base product containing about 10 gm/l ammonia and about 15 gm/l unconverted lactate) was overflowed out of the base recycle tank. The product lactic, at a concentration 250–300 gm/l, was overflowed out of the acid recycle tank 198 under a suitable level control. The flow of acid and base solutions within the cell stack was co-current.

At the conclusion of the test, the cell remained essentially free of internal leaks. The membranes and cell performance was stable, thereby demonstrating the utility of the novel gasket in maintaining a membrane and cell integrity. The metal oxide anode was in excellent condition despite the presence of small amounts of lactic acid in contact with it. It was reused in later experiments with good results.

The problems arising from bipolar membrane breakage and the resultant excessive levels of organics in the electrode rinse loop can be obviated if necessary through the use of a cation or anion exchange membrane next to the end bipolar membrane. Two other options are available if necessary. One option is to separate the two electrode rinse loops, each with its own supply of electrode rinse solution. A second option is to deploy an extra base compartment next to the anolyte. This deployment is achieved easily through a use of an additional bipolar membrane, with the cation selective side facing the cathode. The assembly sequence of components beginning at the anode end would then be: anode, anolyte compartment, cation membrane, base compartment, bipolar membrane, acid compartment, anion membrane, and so on.

Example 2

A nine day test was carried out by using the pilot cell (FIG. 9) (containing bipolar membranes and AMT anion membranes) to process two separate ammonium lactate feed streams that had been subjected to nanofiltration (~200 Daltons rating) in order to remove the bulk of divalent metals, mainly calcium and magnesium. The resultant filtrates, 32 and 48 gm/l lactic in the form of the ammonium lactate salt, respectively, were converted in the acid compartments into a lactic acid product at a concentration of 260–290 gm/l and into a depleted salt stream containing 10–11 gm/l of lactate and 7–10 gm/l of dissolved ammonia in the base compartments. The total calcium content of the two feed streams was 19.5 and 16.8 ppm, respectively, and the magnesium content was in the 8–11 ppm range for both streams. The concentration of the divalent metal ion was high enough to cause both precipitation and current throughput problems in electrodialysis stacks.

In particular, the solubility of magnesium was found to be lower in the base product. Consequently, the material precipitated inside the base loop 206 (at the high pH bipolar membrane surface) and subsequently carried out of the cell 250 and was removed in the external filter 230. In the absence of precipitates, the electrical current throughput was found to be >70 A/ft$^2$ at a unit cell voltage of 3.5 volts. The presence of precipitates in this test reduced the current throughput and required higher voltages for a given current input. In the nine day test, the current ranged 27–32 A (54–64 A/ft$^2$) at a unit cell voltage of ~4 volts.

Example 3

The same feed streams that were used in the previous Example were processed in a plant using commercially purchased electrodialysis cell stacks. These stacks, supplied by Aqualytics, a division of Graver, were of the sheet flow design and utilized a similar bipolar membrane-anion membrane combination with an effective area of six square feet per unit cell. The gaskets in the cell stacks were 0.76 mm thick. Each gasket had six sets of manifold holes (twelve in all) and three sets of ports (six total) for accommodating a solution flow. The linear velocity within the gaskets was 5–6 cm/sec.

Four commercial stacks, each containing two hundred and ten unit cells were used during a five day trial. The cells were operated at 700–750 volts, which translates into a unit cell voltage of 3.2–3.4 V. The conductivity of the base product from the cell stack was 15–20 mS/cm, which is considerably higher than the conductivity used in Example 2, and contained 15–25 gm/l lactic and 5–8 gm/l dissolved ammonia. The current throughput (Amperes) in the electrodialysis (ED) stacks was as follows:

| Days ↓ | ED Stack 1 | ED Stack 2 | ED Stack 3 | ED Stack 4 | Avg. Current |
|---|---|---|---|---|---|
| 1 | 220 | 210 | 185 | 220 | 206 |
| 2 | 235 | 185 | 185 | 212 | 204 |
| 3 | 200 | 155 | 160 | 170 | 172 |
| 4 | 200 | 170 | 180 | 150 | 175 |
| 5 | 140 | 120 | 140 | 125 | 131 |

As can be seen, there were noticeable variations in current throughput between the various stacks. The current throughput also varied with time. Both can be attributed to precipitate formation and to the uneven flow distribution resulting therefrom. The electrical current densities ranging from 37 A/ft$^2$, down to 21 A/ft$^2$ (average current, divided by the effective area of 6 square feet) are significantly lower than that obtained in Example 2 which utilized the gasket of this invention.

Those who are skilled in the art will readily perceive how to modify the invention. Therefore, the appended claims are to be construed to cover all equivalent structures which fall within the true scope and spirit of the invention.

The claimed invention is:

1. A gasket for use in electrodialysis cell stacks, said gaskets comprising an active area, manifold holes, and ports located to supply and remove process liquids to and from the active area, said manifold holes also forming parts of conduits for liquid flow to other gaskets in the cell stack, said gasket having a uniform thickness, the active area of said gasket comprising a plurality of flow path sections connected together to form at least one series flow path within said gasket, said flow path section being 10–49% of the overall gasket width, said individual flow path section being connected to each other by flow restrictor sections at points where the series flow paths turn, the width of the flow restrictor being about 20–90% of the flow path width, a woven or non-woven material having a thickness substantially the same as the thickness of the gasket in said series flow paths in order to promote flow turbulence, said material having an open area for enabling a fluid and electrical flow; two manifold holes per process stream flowing through a series flow path, and two ports each being connected between an individually associated manifold hole and a corresponding end of said series flow path, one of said ports forming a fluid inlet and a second of said port forming a fluid outlet for said series flow path, each of said ports having a thickness which is substantially the same as the thickness of said gasket.

2. A gasket for use in electrodialysis cell stacks, said gasket comprising an active area, manifold holes, and ports located to supply and remove process liquid to and from the active area, said manifold holes also forming parts of conduits for liquid flow to other gaskets in the cell stack, said gasket having a uniform thickness, the active area of said gasket comprising a plurality of flow path sections connected together to form at least one series flow path sections connected together to form at least one series flow path within said gasket, at least one flow path section being 10–49% of the overall gasket width, said individual flow path sections being connected to each other by flow restrictor sections at points which make said series flow path turn, a woven or non-woven material having a thickness substantially the same as the thickness of the gasket in said series flow paths in order to promote a flow turbulence, said material having an open area for enabling a fluid and electrical flow; two manifold holes per process stream flowing through a series flow path, and two ports each being connected between an individually associated manifold hole and a corresponding end of said series flow path, one of said ports forming a fluid inlet and a second of said ports forming a fluid outlet for said series flow path, each of said ports having a thickness which is substantially the same as the thickness of said gasket, wherein said ports have a rigidity which is more rigid than the gasket, and each of said ports have substantially flat top and bottom surfaces, said series fluid flow path forming a complete channel extending between said two ports.

3. The gasket of claim 2 wherein each of said plurality of flow path sections has substantially the same width and is separated from other of said flow path sections by ribs of said gasket, said ribs being 05.–5 mm wide.

4. The gasket of claim 2 wherein said gasket has two to six series flow paths.

5. The gasket of claim 2 wherein the flow path sections form channels having a width that is in the range of 2.5 to 12 inches.

6. The gasket of claim 2 wherein said material is non-woven mesh material, a fluid channel formed in the ports is made of the non-woven mesh having a mesh density which is at least of equal to a density of the mesh that is used as said material in the series flow path.

7. The gasket of claim 2 wherein the ports are a composite of flat films and non-woven mesh materials.

8. The gasket of claim 2 having a plurality of said series flow paths connected parallel and supplied with said process stream from common inlet and to common outlet manifold holes via said ports.

9. The gasket of claim 2 wherein said ports couple said fluid flow sections to form said series flow path, said flat top and bottom surfaces sealing against adjacent membranes responsive to pressure claiming said stack together.

10. The gasket of claim 9 wherein said material is a non-woven mesh material, each of the flow restrictor sections comprises a non-woven mesh having a mesh density which is higher than a mesh density that is used as said material in the series flow path.

11. An electrodialysis cell stack comprising a plurality of the gaskets of claim 2, said plurality of gaskets being assembled in a face to face stack, individual ones of said gaskets forming cells separated by ion exchange membranes.

12. The electrodialysis cell stack of claim 11 which contains multicompartment cells selected from a group consisting of two, three, or four compartment cells, arranged in successive compartments selected from a group consisting of dilute/concentrate, salt/acid, or salt/base, said cells being defined by separating bipolar membranes, with monopolar membranes therebetween.

13. A two-compartment electrodialysis cell stack of claim 12, wherein each of said cells is defined by a pair of bipolar ion-exchange membranes with exchange membranes between said bipolar membranes, said exchange membranes being selected from a group consisting of anion and cation membranes, said gaskets being clamped between said membranes in order to form said stack.

14. A three-compartment electrodialysis cell stack of claim 12 with cation and anion exchange membranes between said pair of bipolar membranes, and with said gaskets between and sealed between and against said membranes.

15. The electrodialysis cell of claim 11 further comprising a noble metal oxide coated anode at one end of said stack.

16. The electrodialysis cell of claim 15 further comprising an electrolyte in the form of a dilute solution of an inorganic acid circulating in electrode compartments.

17. The electrodialysis cell of claim 16 wherein the acid is sulfuric acid.

18. The electrodialysis cell of claim 11 further comprising an anode at one end of said stack said anode being ruthenium oxide coated on a titanium substrate.

19. The electrodialysis cell of claim 18 further comprising a base compartment next to a cation exchange membrane which in turn adjoins an anolyte.

20. A gasket for use in electrodialysis cell stacks, said gasket comprising an active area, manifold holes, and ports located to supply and remove process liquid to and from the active area, said manifold holes also forming parts of conduits for liquid flow to other gaskets in the cell stack, said gasket having a uniform thickness, the active area of said gasket comprising a plurality of flow path sections connected together to form at least one series flow path sections connected together to form at least one series flow path within said gasket, at least one flow path section being 10–49% of the overall gasket width, said individual flow path sections being connected to each other by flow restrictor sections at points which make said series flow path turn, a woven or non-woven material having a thickness substantially the same as the thickness of the gasket in said series flow paths in order to promote a flow turbulence, said material having an open area for enabling a fluid and electrical flow; two manifold holes per process stream flowing through a series flow path, and two ports each being connected between an individually associated manifold hole and a corresponding end of said series flow path, one of said ports forming a fluid inlet and a second of said ports forming a fluid outlet for said series flow path, each of said ports having a thickness which is substantially the same as the thickness of said gasket, wherein said cell stack is a two compartment electrodialysis cell having a first plurality and a second plurality of said gaskets, and each of said gaskets has two sets of conduit manifold holes for said two compartment electrodialysis cell, one set of manifold holes supplying said first plurality of said gaskets in said stack, and the other of said manifold holes supplying said second plurality of gaskets in said stack.

21. A gasket for use in electrodialysis cell stacks, said gasket comprising an active area, manifold holes, and ports located to supply and remove process liquid to and from the active area, said manifold holes also forming parts of conduits for liquid flow to other gaskets in the cell stack, said gasket having a uniform thickness, the active area of said gasket comprising a plurality of flow path sections connected together to form at least one series flow path sections connected together to form at least one series flow path within said gasket, at least one flow path section being 10–49% of the overall gasket width, said individual flow path sections being connected to each other by flow restrictor sections at points which make said series flow path turn, a woven or non-woven material having a thickness substantially the same as the thickness of the gasket in said series flow paths in order to promote a flow turbulence, said material having an open area for enabling a fluid and electrical flow; two manifold holes per process stream flowing through a series flow path, and two ports each being connected between an individually associated manifold hole and a corresponding end of said series flow path, one of said ports forming a fluid inlet and a second of said ports forming a fluid outlet for said series flow path each of said ports having a thickness which is substantially the same as the thickness of said gasket, wherein said stack has a first, second, and third plurality of said gaskets, and each of said gaskets has three sets of conduit manifold holes for supplying process streams to three compartment electrodialysis cells, a first set of said manifold holes supplying said first plurality of said gaskets, a second set of said manifold holes supplying said second plurality of said gaskets, and a third set of said manifold holes supplying said third plurality of said gaskets.

22. A gasket for an electrodialysis stack comprising an active area covered by at least a supporting mesh, ribs of gasket material separating said active area into flow path sections joined by restriction sections to form a series flow path extending between two ends, at least one manifold hole at each of said two ends of said series flow path, and said port structure means having flat upper and lower surfaces co-planar with opposite sides of said gasket.

23. The gasket of claim 22 wherein said gasket has a predetermined thickness, said port structure means comprises a plate having a thickness which is substantially equal to said predetermined thickness of said gasket, and said port structure means further having a plurality of through holes extending therethrough for interconnecting said manifold holes with said series flow path.

24. The gasket of claim 23 and an elastomer material covering a top and a bottom of said port structure means.

25. The gasket of claim 23 wherein said port structure means comprises two plates held in face to face confrontation and said through holes are grooves extending across at least one of said confronting faces.

26. The gasket of claim 23 wherein said port structure means is a non-woven mesh having fluid communicating passage ways therein with film layers above and below said non-woven mesh in order to confine any liquid flowing between said manifold holes and said series flow path within said non-woven mesh.

27. The gasket of claim 26 wherein there are a plurality of layers of said non-woven mesh in said port structure means.

28. The gasket of claim 27 wherein said non-woven mesh in said port structure has a first density, and said supporting supporting mesh covering said active area has a second density, said first density being greater than said second density.

* * * * *